US010405143B2

(12) United States Patent
Graves

(10) Patent No.: US 10,405,143 B2
(45) Date of Patent: Sep. 3, 2019

(54) SYSTEMS AND METHODS FOR AUTONOMOUS EQUIPMENT OPERATION WHERE GPS NOT AVAILABLE

(71) Applicant: DENSO International America, Inc., Southfield, MI (US)

(72) Inventor: Jason Graves, Oceanside, CA (US)

(73) Assignee: DENSO International America, Inc., Southfield, MI (US)

( * ) Notice: Subject to any disclaimer, the term of this patent is extended or adjusted under 35 U.S.C. 154(b) by 163 days.

(21) Appl. No.: 15/079,966

(22) Filed: Mar. 24, 2016

(65) Prior Publication Data

US 2017/0280278 A1 Sep. 28, 2017

(51) Int. Cl.
*H04W 4/029* (2018.01)
*G05D 1/02* (2006.01)

(52) U.S. Cl.
CPC .......... *H04W 4/029* (2018.02); *G05D 1/0276* (2013.01)

(58) Field of Classification Search
CPC ................... H04W 4/02; G05B 19/402; G05B 2219/31034; G05B 2219/45004
USPC .......................................................... 700/66
See application file for complete search history.

(56) References Cited

U.S. PATENT DOCUMENTS

| 6,370,452 | B1 * | 4/2002 | Pfister .................. G05D 1/0297 |
| | | | 701/23 |
| 6,516,765 | B1 | 2/2003 | Becker, Jr. |
| 6,694,233 | B1 | 2/2004 | Duff et al. |
| 8,294,568 | B2 * | 10/2012 | Barrett .............. H04M 3/42348 |
| | | | 340/539.11 |
| 8,315,789 | B2 * | 11/2012 | Dunbabin ............ G05D 1/0274 |
| | | | 340/436 |

(Continued)

FOREIGN PATENT DOCUMENTS

JP 2009115712 A 5/2009

OTHER PUBLICATIONS

John B. Kenney, Dedicated Short-Range Communications (DSRC) Standards in the United States, Jul. 2011, Proceedings of the IEEE, vol. 99, pp. 1162-1182.*

(Continued)

*Primary Examiner* — Robert E Fennema
*Assistant Examiner* — Christopher W Carter
(74) *Attorney, Agent, or Firm* — Harness, Dickey & Pierce, P.L.C.

(57) ABSTRACT

A system for autonomous operation of equipment in an environment inaccessible to GPS. The system includes a plurality of location controllers configured to be arranged in the environment. Each one of the location controllers includes a ranging transmitter/receiver, a communication transmitter/receiver, and a control module. The ranging transmitter/receiver is configured to measure controller distance to another one of the location controllers to map the environment, and measure equipment distance to the equipment to determine the equipment's location. The communication transmitter/receiver is configured to transmit the measured controller distance to the master controller, and transmit directional commands to the equipment. A master location controller is configured to build a map of the environment based on the measured controller distances. The plurality of location controllers transmit directional commands to the equipment.

17 Claims, 4 Drawing Sheets

(56) References Cited

U.S. PATENT DOCUMENTS

2007/0252728 A1* 11/2007 Wisherd ................. G07B 15/02
340/933
2009/0212995 A1* 8/2009 Wu ....................... G01S 5/0278
342/109
2011/0168123 A1 7/2011 Kerr

OTHER PUBLICATIONS

Richard Wilson, ZigBee Wireless Operates Like a Location System, Jul. 9, 2013, ElectronicsWeekly.com, pp. 1-6, https://www.electronicsweekly.com/news/design/communications/zigbee-wireless-operates-like-a-location-system-2013-07/ (Year: 2013).*

* cited by examiner

SYSTEMS AND METHODS FOR AUTONOMOUS EQUIPMENT OPERATION WHERE GPS NOT AVAILABLE

FIELD

The present disclosure relates to systems and methods for autonomous equipment operation where GPS is not available, such as underground.

BACKGROUND

This section provides background information related to the present disclosure, which is not necessarily prior art.

Use of autonomous equipment/vehicles in heavy equipment industries would be desirable. For example, it would be desirable to use autonomous mining-related equipment in the mining industry. However, issues arise in that GPS is not available when mining equipment is underground. Systems and methods for autonomous equipment operation where GPS is not available would therefore be desirable. The present teachings advantageously provide such systems and methods.

SUMMARY

This section provides a general summary of the disclosure, and is not a comprehensive disclosure of its full scope or all of its features.

The present teachings provide for a system for autonomous operation of equipment in an environment inaccessible to GPS. The system includes a plurality of location controllers configured to be arranged in the environment. Each one of the location controllers includes a ranging transmitter/receiver, a communication transmitter/receiver, and a control module. The ranging transmitter/receiver is configured to measure controller distance to another one of the location controllers to map the environment, and measure equipment distance to the equipment to determine the equipment's location. The communication transmitter/receiver is configured to transmit the measured controller distance to the master controller, and transmit directional commands to the equipment. A master location controller is configured to build a map of the environment based on the measured controller distances. The plurality of location controllers transmit directional commands to the equipment.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
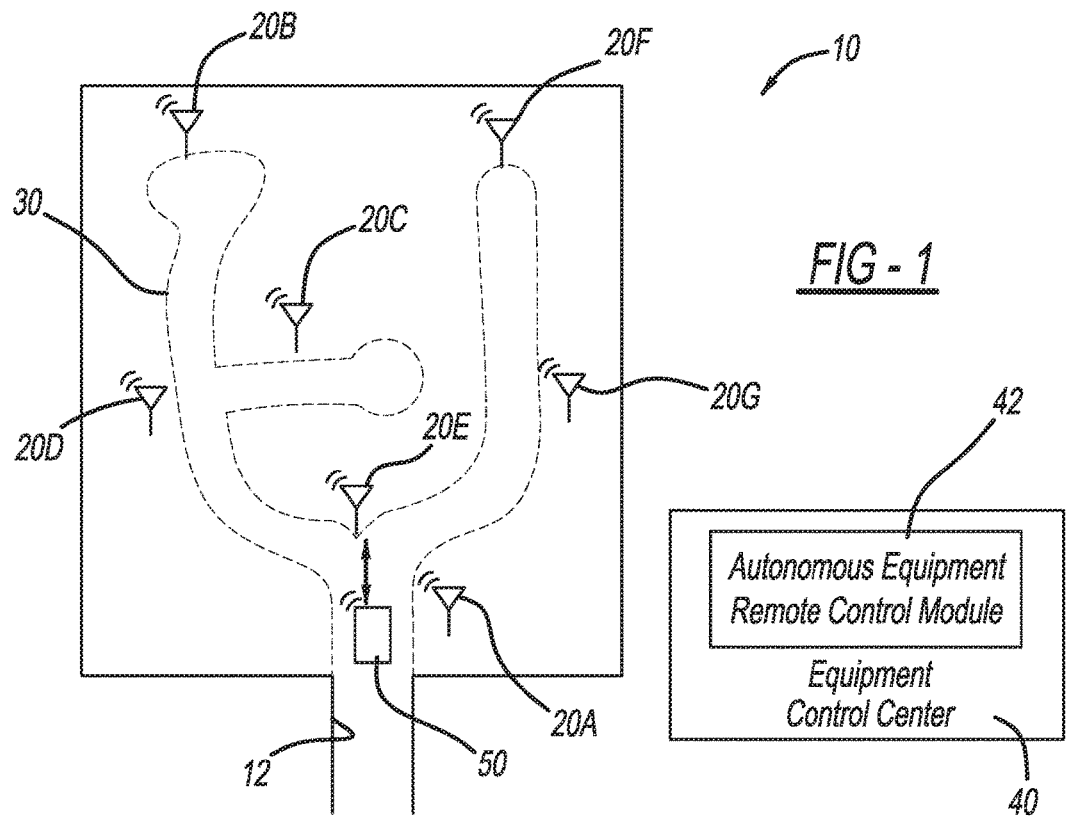
FIG. 1 illustrates a plurality of location controllers according to the present teachings arranged in an underground environment, and an autonomous equipment control center.

With initial reference to FIG. 1, an exemplary environment where the global positioning system (GPS) is not accessible is illustrated at reference numeral 10. The environment 10 can be any environment where GPS is inaccessible and/or unavailable, such as an underground environment, including an underground mining environment. A plurality of location controllers 20A-20G are arranged throughout the environment at exemplary locations. The location controllers 20A-20G can be arranged at any suitable position about the environment 10, and any suitable number of the location controllers 20A-20G can be included. Typically, each one of the location controllers 20A-20G is positioned such that each one of the location controllers 20A-20G is within line of sight of at least another one of the location controllers 20A-20G.

The location controllers 20A-20G are configured to map the environment 10 using any suitable ranging technology, as described herein. An exemplary map is illustrated in FIG. 1 at reference numeral 30, and is generally derived from placement of the location controllers 20A-20G. At least one of the location controllers 20A-20G is arranged at an entry/exit point 12 of the environment 10, such as the location controller 20A of FIG. 1. The location controller 20A is configured as a master location controller, as described in detail herein. Location controller 20E generally defines a fork in the map 30. Location controllers 20B and 20F generally define end points of the map 30. Location controller 20G is at a curve of the map 30. Location controller 20D is at an intersection of the map 30. Location controller 20C identifies a side "street" of the map 30.

FIG. 1 further illustrates an equipment control center 40, which includes an autonomous equipment remote control module 42. The equipment control center 40, as well as the remote control module 42 thereof, can be at, proximate to, or at a remote location with respect to the environment 10. For example, the equipment control center 40 can be onsite at a mining site, or at a remote location connected to the environment 10 by way of the internet or any other suitable network or communication system. The autonomous equipment remote control module 42 can include any suitable processor (shared, dedicated, or group) configured to execute code, and can include any suitable memory hardware (shared, dedicated, or group) configured to store code that can be executed by the processor. The code is configured to provide the features of the autonomous equipment remote control module 42 and the equipment control center 40 described herein.

The present teachings apply to any type of equipment configured to be autonomously driven and/or directed through the environment 10. In FIG. 1, the autonomous equipment is generally illustrated at reference numeral 50.

Figure 3:
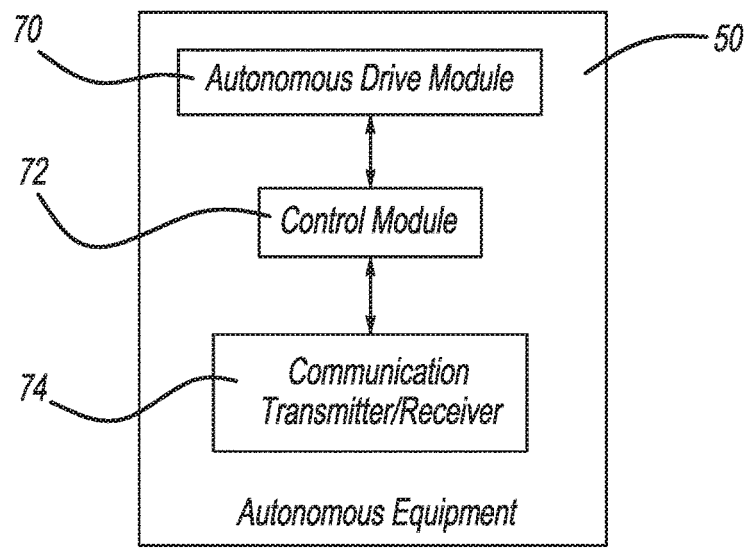
FIG. 3 illustrates components of autonomous equipment according to the present teachings.

The equipment 50 can be any type of autonomous equipment, such as any type of heavy duty construction equipment, including mining equipment. Exemplary features of the equipment 50 are illustrated in FIG. 3, and will be described further herein.

Figure 2:
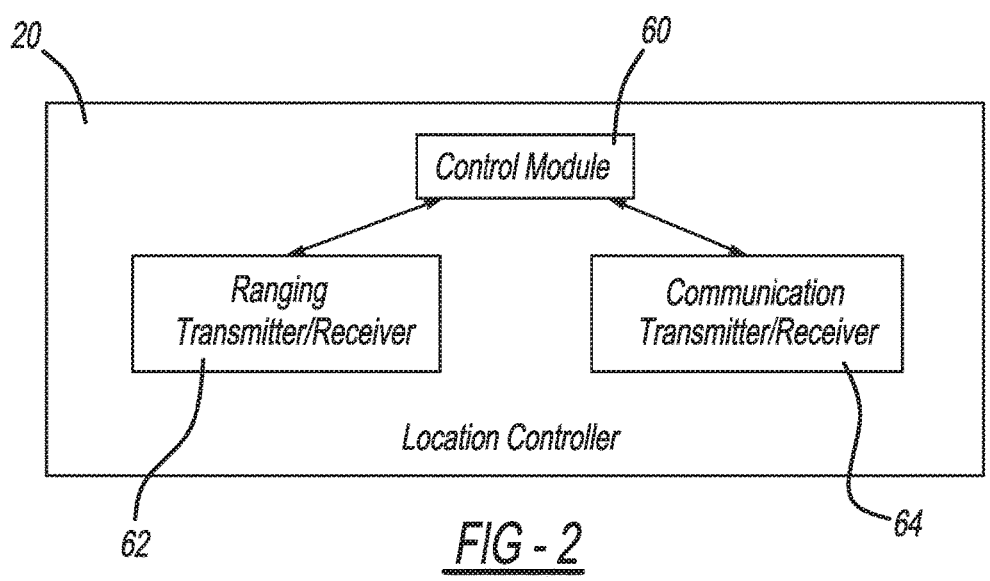
FIG. 2 illustrates components of one of the location controllers of FIG. 1.

FIG. 2 illustrates an exemplary one of the location controllers 20A-20G at reference numeral 20. The features of the location controller 20, and the description thereof, applies to any one of the location controllers 20A-20G. The location controller 20 generally includes a control module 60, a ranging transmitter/receiver 62, and a communications transmitter/receiver 64. The control module 60 can include any suitable processor hardware (shared, dedicated, or group) configured to execute code, and can include memory hardware (shared, dedicated, or group) that stores code executed by the hardware of the control module 60. The code is configured to provide the features of the location controller 20 described herein. The control module 60 controls the ranging transmitter/receiver 62, as well as the communications transmitter/receiver 64.

The ranging transmitter/receiver 62 is configured to measure distance between location controllers 20A-20G in any suitable manner using any suitable ranging technology. For example, the ranging transmitter/receiver 62 can be configured to measure controller distance between location controllers 20A-20G using any one or more of radar, lidar, sonar, and ultra-wide band. The ranging transmitter/receiver 62 is typically configured to measure distance between location controllers 20A-20G that are within line of sight of one another. The ranging transmitter/receiver 62 is further configured to measure distance between the location controller 20 and the equipment 50.

The communications transmitter/receiver 64 is configured to communicate using any suitable wireless radio technology, such as dedicated short range communication (DSRC) and/or Wi-Fi. The communications transmitter/receiver 64 is configured to transmit ranging data gathered using the ranging transmitter/receiver 62 to the master location controller 20A. The communications transmitter/receiver 64 is further configured to transmit operational commands, such as directional commands, to the equipment 50 in order to guide the equipment 50 through the environment 10, as described in detail herein.

With respect to the master location controller 20A, the control module 60 thereof is configured to gather all of the ranging data obtained by the location controllers 20B-20G obtained using the ranging transmitter/receiver 62, the ranging data representing distances between the location controllers 20A-20G. The control module 60 of the master location controller 20A is configured to use the ranging data to identify the location of each one of the location controllers 20B-20G, and prepare the map 30 based thereon. The communications transmitter/receiver 64 of the master location controller 20A is configured to transmit the map data from the master location controller 20A to the equipment control center 40 and/or the equipment 50.

FIG. 3 illustrates features of the exemplary autonomous equipment 50. The equipment 50 generally includes an autonomous drive module 70, a control module 72, and a communications transmitter/receiver 74. The autonomous drive module 70 includes any suitable mechanical equipment, processor hardware, and memory hardware storing code, which when executed by the processor is configured to autonomously drive the equipment 50. The control module 72 is configured to control the autonomous drive module 70 and the communications transmitter/receiver 74. The control module 72 can be part of, or include, processor hardware (shared, dedicated, or group) that executes code, as well as memory hardware (shared, dedicated, or group) that stores code, which when executed by the processor hardware provides the features of the control module 72 described herein.

The communications transmitter/receiver 74 is configured to wirelessly communicate with the location controllers 20A-20G, as well as the equipment control center 40, as described herein. The communications transmitter/receiver 74 can communicate using any suitable communications protocol. The communications transmitter/receiver 74 can communicate by way of wireless radio communication, such as by way of dedicated short range communication (DSRC) and Wi-Fi.

Figure 4:
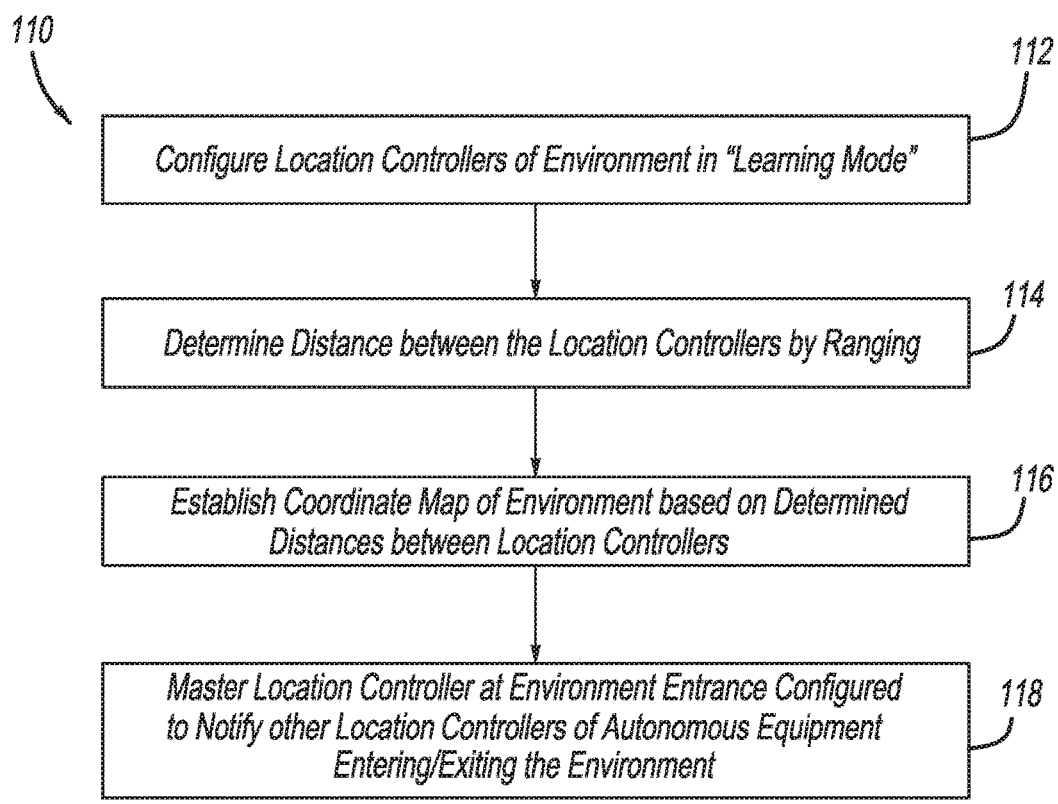
FIG. 4 illustrates a method according to the present teachings for establishing a map of the underground environment.

With continued reference to FIGS. 1-3, and additional reference to FIG. 4, a method according to the present teachings for mapping the environment 10 using the location controllers 20A-20G is illustrated at reference numeral 110. With initial reference to block 112, after the location controllers 20A-20G are arranged throughout the environment 10, they are set to a "learning mode." At block 114, the distance between each one of the location controllers 20A-20G is determined using the ranging transmitter/receiver 62 of each one of the location controllers 20A-20G. The distances measured by the ranging transmitter/receiver 62 are transmitted to the communications transmitter/receiver 64 of the master location controller 20A.

At block 116, the master location controller 20A establishes the coordinate map of the environment 10, such as the map 30, based on the distances measured by the ranging transmitter/receiver 62 of each one of the location controllers 20A-20G. With reference to block 118, the master location controller 20A is then set on standby to notify the other location controllers 20B-20G when the equipment 50 enters the environment 10. The master location controller 20A can notify the location controllers 20B-20G in any suitable manner, such as by radio communication transmitted from the communications transmitter/receiver 64.

Figure 5:
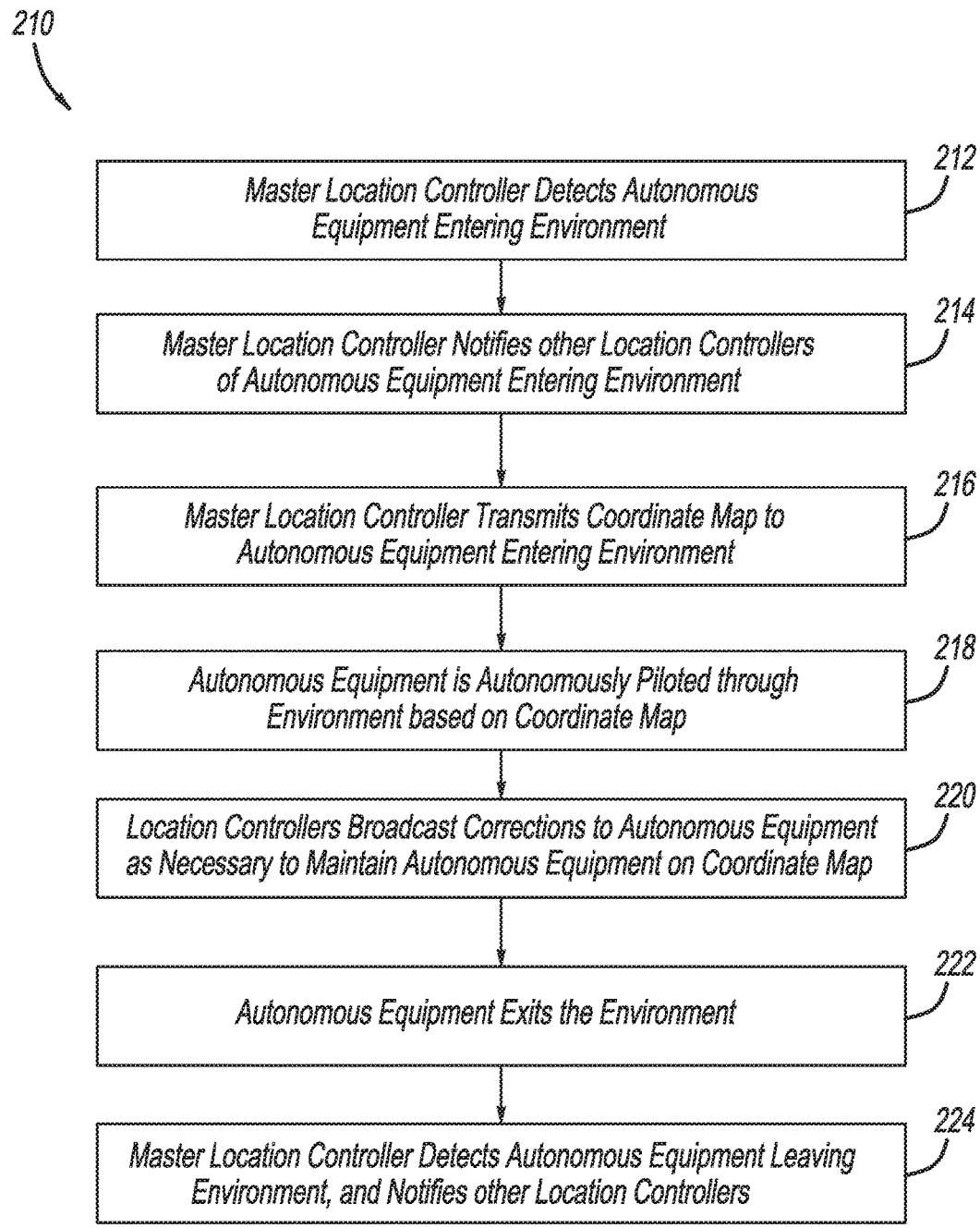
FIG. 5 illustrates a method according to the present teachings for autonomously operating equipment in an underground environment.

FIG. 5 illustrates an exemplary method for autonomously operating the equipment 50 in the environment 10. With initial reference to block 212, the master location controller 20A detects the equipment 50 in any suitable manner as the equipment 50 enters the environment 10. At block 214, the master location controller 20A transmits a signal from its communications transmitter/receiver 74 to the other location controllers 20B-20G to notify the controllers 20B-20G that the equipment 50 is entering, or has entered, the environment 10.

At block 216, the master location controller 20A transmits the coordinate map established at block 116 to the equipment 50 entering the environment 10. With reference to block 218, the equipment 50 is autonomously piloted through the environment 10 based on the coordinate map 30 by the autonomous drive module 70. To maintain the equipment 50 on the coordinate map 30, the location controllers 20A-20G broadcast route correction information to the equipment 50 as necessary, as set forth at block 220. Specifically, as the equipment 50 is piloted through the environment 10 by the autonomous drive module 70, the ranging transmitter/receiver 62 of the location controller 20A-20G closest to the equipment 50 continuously monitors the location of the equipment 50 to make sure that the equipment 50 is on the coordinate map 30. If the equipment 50 strays from the map 30, the communications transmitter/receiver 64 of the closest location controller 20A-20G transmits corrections to the equipment 50 using the communications transmitter/receiver 64, and specifically to the autonomous drive module 70 thereof by way of the communications transmitter/receiver 74. Once the equipment 50 exits the environment 10 at block 222, the master location controller 20A detects that the equipment 50 is exiting the environment 10, and notifies the other location controllers 20B-20G accordingly at block 224.

Figure 6:
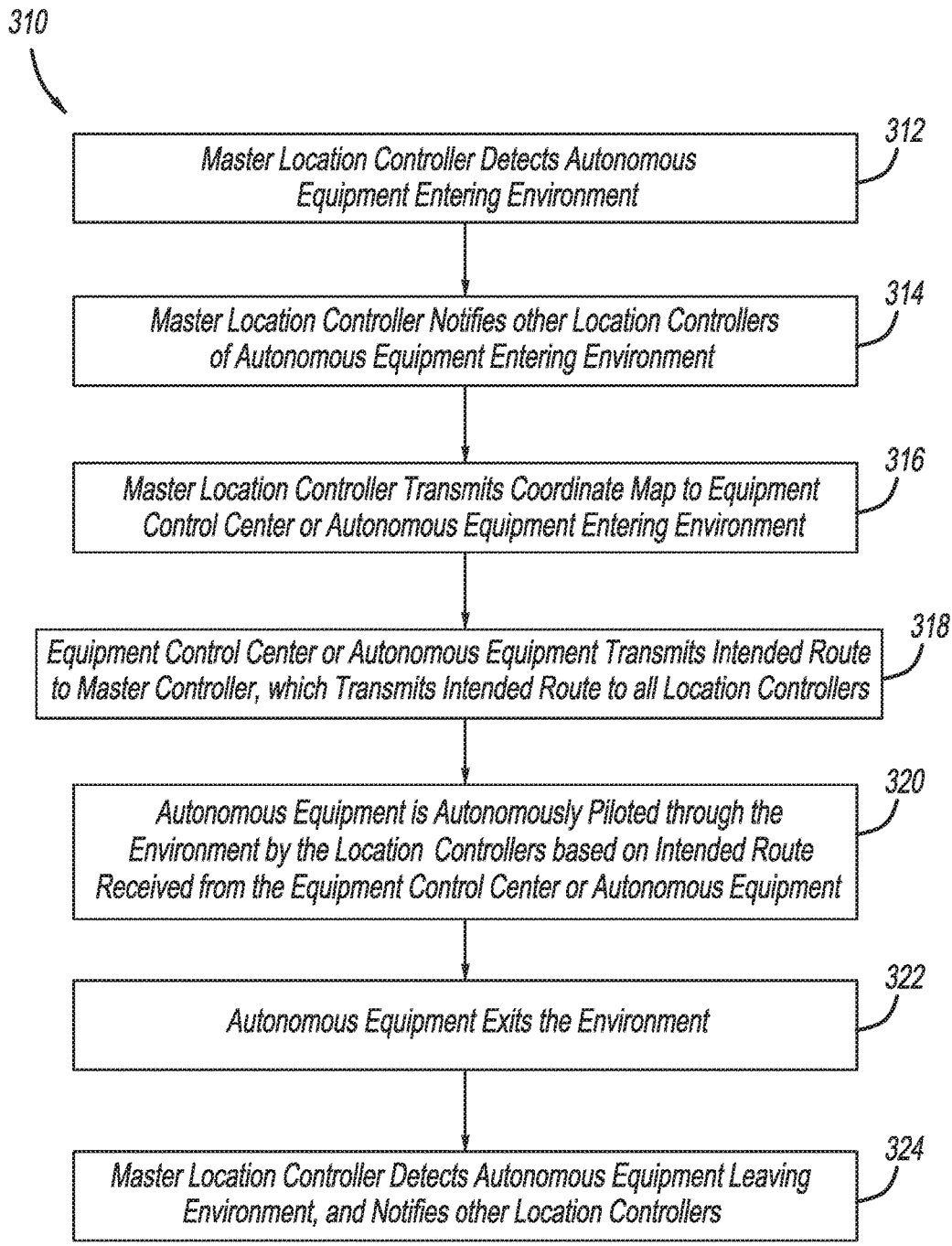
FIG. 6 illustrates additional methods according to the present teachings for autonomously operating equipment in an underground environment.

An additional method for autonomously operating the equipment 50 in the environment 10 is illustrated in FIG. 6 at reference numeral 310. The method 310 is similar to the method 210, and thus blocks 312 and 314 are the same as blocks 212 and 214. With respect to block 316 of the method 310, the master location controller 20A is configured to transmit the coordinate map to the equipment control center 40, and/or the equipment 50 itself. With reference to block 318, the equipment control center 40 and/or the autonomous equipment 50 itself, transmits the intended route of the equipment 50 to the master location controller 20A. The master location controller 20A in turn transmits the intended route to all of the other location controllers 20B-20G.

With reference to block 320, the autonomous equipment 50 is autonomously piloted through the environment by the location controllers 20A-20G based on the intended route received from the equipment control center 40 or the equipment 50 itself. Specifically, because each one of the location controllers 20A-20G knows the intended route of the equipment 50, each one of the location controllers 20A-20G can monitor the position of the equipment 50 using the ranging transmitter/receiver 62 thereof, and transmit directions to the equipment 50 using the communications transmitter/receiver 64 in order to maintain the equipment 50 on its intended route. When the autonomous equipment 50 exits the environment 10 at block 322, the master location controller 20A detects that the equipment 50 is leaving the environment 10 and notifies the other location controllers 20B-20G at block 324, so that the location controllers 20B-20G can operate in a standby mode in order to conserve power.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for autonomous operation of equipment in an underground environment inaccessible to global positioning system (GPS) signals, the system comprising:
   a plurality of location controllers configured to be arranged in the underground environment, at least one of the plurality of location controllers operable to be configured as a master location controller, each one of the location controllers including:
   a ranging transmitter/receiver configured to measure controller distance to another one of the location controllers to map the underground environment, and measure equipment distance to the equipment to determine the equipment's location;

a communication transmitter/receiver configured to transmit the measured controller distance to the master controller, and transmit directional commands to the equipment; and a control module configured to operate the ranging transmitter/receiver and the communication transmitter/receiver;

wherein the master location controller is configured to:

build a map of the underground environment and define an underground route therethrough for the equipment based on the measured controller distances;

detect entry and exit of the equipment into the underground environment;

transmit a signal to the communication transmitter/receiver of each one of the plurality of location controllers to notify the plurality of location controllers of the entry and exit of the equipment; and transmit the map and underground route to at least one of the equipment and an equipment control center;

wherein the plurality of location controllers transmit directional commands to the equipment to guide the equipment within the underground environment;

wherein the ranging transmitter/receiver is configured to measure controller distance only to location controllers within line of sight of one another;

wherein the master location controller is configured to determine which one of the plurality of location controllers is closest to the equipment; and wherein the one of the plurality of location controllers closest to the equipment continuously monitors location of the equipment to identify when the equipment strays from the underground route of the map, and when the equipment strays from the route the one of the location controllers that is closest to the equipment transmits directional corrections to the equipment for returning the equipment to the route.

2. The system of claim 1, wherein the ranging transmitter/receiver is configured to measure controller distance with at least one of lidar, radar, sonar, and ultra-wideband.

3. The system of claim 1, wherein the communication transmitter/receiver is configured to communicate using wireless radio communication.

4. The system of claim 3, wherein the communication transmitter/receiver is configured to communicate using at least one of dedicated short range communication (DSRC) and WiFi.

5. The system of claim 1, wherein the autonomous equipment is mining equipment.

6. The system of claim 1, wherein the autonomous equipment is autonomously piloted through the underground environment based on the map stored onboard the autonomous equipment.

7. The system of claim 1, wherein:

the master controller is configured to receive an intended route of the equipment transmitted from the equipment control center or the equipment; and the master controller is configured to transmit the intended route to the plurality of location controllers.

8. The system of claim 7, wherein the location controllers are configured to guide the equipment through the environment based on the received intended route.

9. The system of claim 1, wherein:

the vehicle is guided through the environment without GPS.

10. A method for autonomous operation of equipment in an underground environment inaccessible to global positioning system (GPS) signals, the method comprising:

arranging a plurality of location controllers about the underground environment such that each one of the plurality of location controllers is within line of slight of another one of the plurality of location controllers;

measuring controller distances between only the location controllers that are within line of sight of one another with a ranging transmitter/receiver of each one of the plurality of location controllers;

transmitting the controller distances to one of the location controllers configured as a master location controller with a communication transmitter/receiver of each one of the plurality of location controllers;

building a map of the underground environment and defining an underground route therethrough based on the controller distances transmitted to the master location controller;

transmitting the map from the master location controller to at least one of the equipment and an equipment control center;

measuring an equipment distance between the equipment and the location controller closest to the equipment with the ranging transmitter/receiver;

transmitting directional commands to the equipment to guide the equipment within the underground environment along the underground route;

determining which one of the plurality of location controllers is closest to the equipment; and wherein the one of the plurality of location controllers closest to the equipment continuously monitors location of the equipment to identify when the equipment strays from the underground route of the map, and when the equipment strays from the route the one of the location controllers that is closest to the equipment transmits directional corrections to the equipment for returning the equipment to the route.

11. The method of claim 10, wherein the controller distance is measured with at least one of lidar, radar, sonar, and ultra-wideband.

12. The method of claim 10, further comprising transmitting the measured controller distance to the master location controller, and transmitting directional commands to the equipment, using wireless radio communication.

13. The method of claim 10, wherein the communication transmitter/receiver is configured to communicate using at least one of dedicated short range communication (DSRC) and WiFi.

14. The method of claim 10, further comprising autonomously piloting the equipment through the underground environment based on the map stored onboard the autonomous equipment.

15. The method of claim 10, further comprising:

transmitting an intended route of the autonomous equipment to the master controller from the equipment control center or the equipment; and transmitting the intended route to the plurality of location controllers.

16. The method of claim 15, further comprising autonomously piloting the equipment through the underground environment based on the received intended route by transmitting directional commands from the location controllers to the equipment.

17. The method of claim 15, further comprising autonomously piloting the equipment underground without GPS.

* * * * *